3,414,473
VAPOR-COOLED REACTOR SYSTEM
Donald C. Schluderberg, Gordon R. Winders, and John S. Dossett, Lynchburg, Va., assignors to The Babcock & Wilcox Company, New York, N.Y., a corporation of New Jersey
Filed Oct. 3, 1966, Ser. No. 583,519
13 Claims. (Cl. 176—56)

ABSTRACT OF THE DISCLOSURE

A nuclear reactor comprising a containment vessel occupied by a reactor vessel containing a cylindrical shell in its upper portion and a vapor separating chamber in its lower portion. The shell encloses a nuclear core, is fitted with circulators forcing vapor through the core, and cooperates with the reactor vessel to provide a vapor flow path from the separating chamber to the circulators. Vapor from the separating chamber is directed to the circulators and forced through the core wherein it is superheated. Part of the superheated vapor is directed to a prime mover and another part to a desuperheater wherein its excess heat is used to evaporate feedwater which is supplied at a rate in excess of the total vapor demand. The resulting saturated vapor is directed to the separating chamber and thence to the circulators.

---

Figure 1:
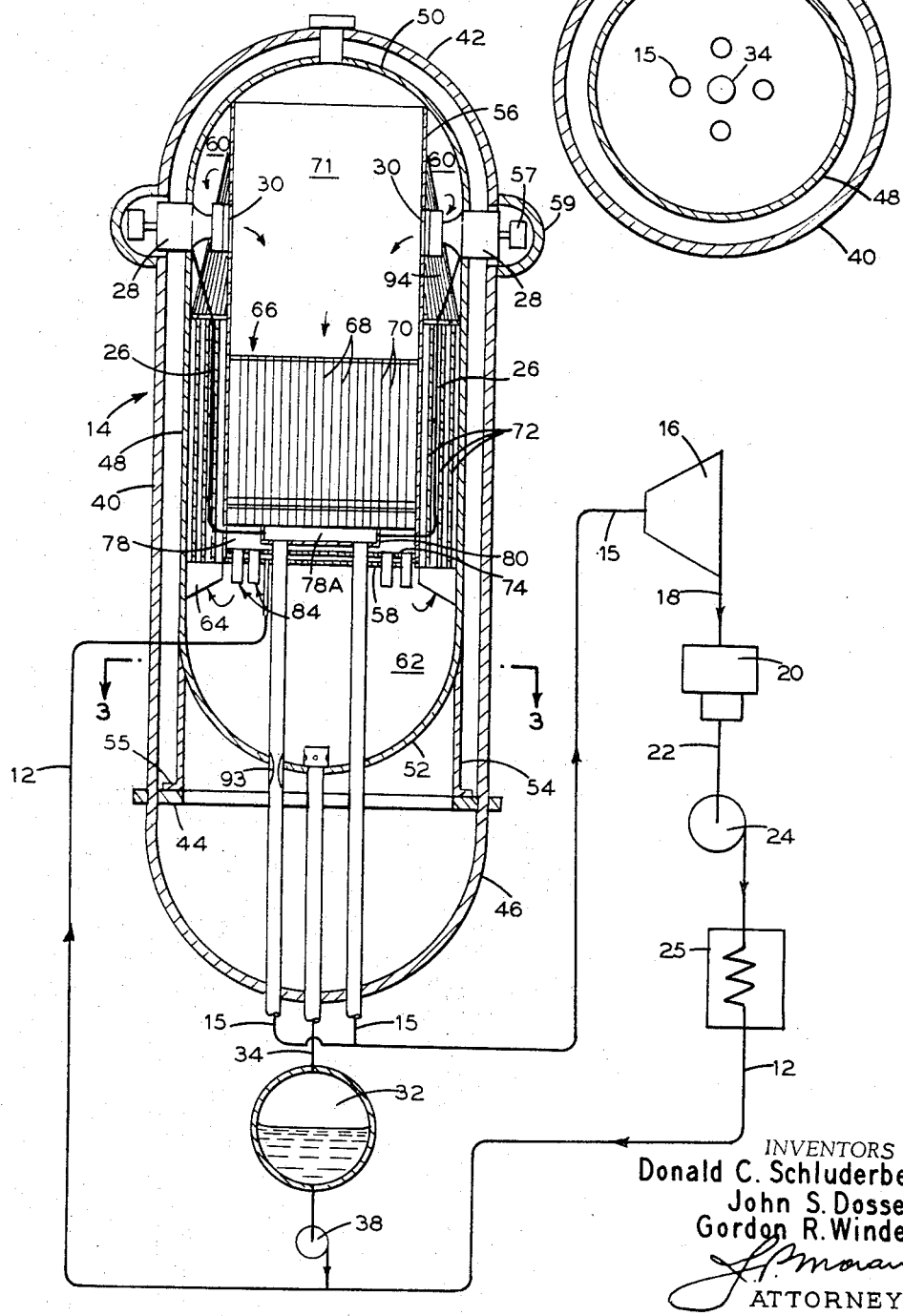

The present invention is directed to a nuclear power plant and more particularly to a plant of the character described embodying a vapor cooled fast breeder reactor.

It is known in the art to employ the Loeffler boiler cycle to produce saturated vapor for use as coolant in a fast breeder reactor. In known applications, the fast breeder reactor uses a direct cycle where about one-third of the superheated vapor produced in the reactor is supplied directly to a prime mover. The remainder is used to vaporize feed water returning from the condenser in a Loeffler boiler. The combined vapor flow discharges from this boiler at saturation temperature and is returned to the reactor by means of vapor circulators driven by vapor turbines and/or electric motors. Designs of the prior art have uniformly involved physical separation of the reactor, vapor circulator and heat exchanger components. While such an arrangement is functionally satisfactory, it is unduly costly and complex, is relatively unsuitable where space is at a premium, is susceptible to severe and dangerous coolant loss accidents, and requires high pumping power.

Thus the general object of the present invention is the provision of a vapor cooled fast breeder reactor system possessing the virtues of compactness, simplicity, reliability and ability to provide sustained efficient operation at relatively low heat rates. A further and more specific object of the invention is the provision of a system of the type described wherein the reactor vessel contains the vapor generator and vapor circulator components.

In accordance with the invention the nuclear reactor comprises a containment vessel occupied by a reactor vessel containing a cylindrical shell in its upper portion and a vapor separating chamber in its lower portion. The shell encloses a nuclear core, is fitted with circulators forcing vapor through the core, and cooperates with the reactor vessel to provide a vapor flow path from the separating chamber to the circulators. Vapor from the separating chamber is directed to the circulators and forced through the core wherein it is superheated. Provisions are made for directing part of this superheated vapor to the prime mover and for flowing another part to a desuperheater wherein its excess heat is used to evaporate feed water which is supplied at a rate in excess of the total vapor demand. The resulting saturated vapor is directed to the separating chamber and thence to the circulators. Compared to prior nuclear systems of the character described, the invention arrangement minimizes the possibility and consequence of a coolant loss accident, provides a reduction in the volume requirements for the containment and shielding, improves power density and economics, reduces pumping power requirements, provides stable load-following reactor performance, simplifies plant arrangement and reduces capital costs.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
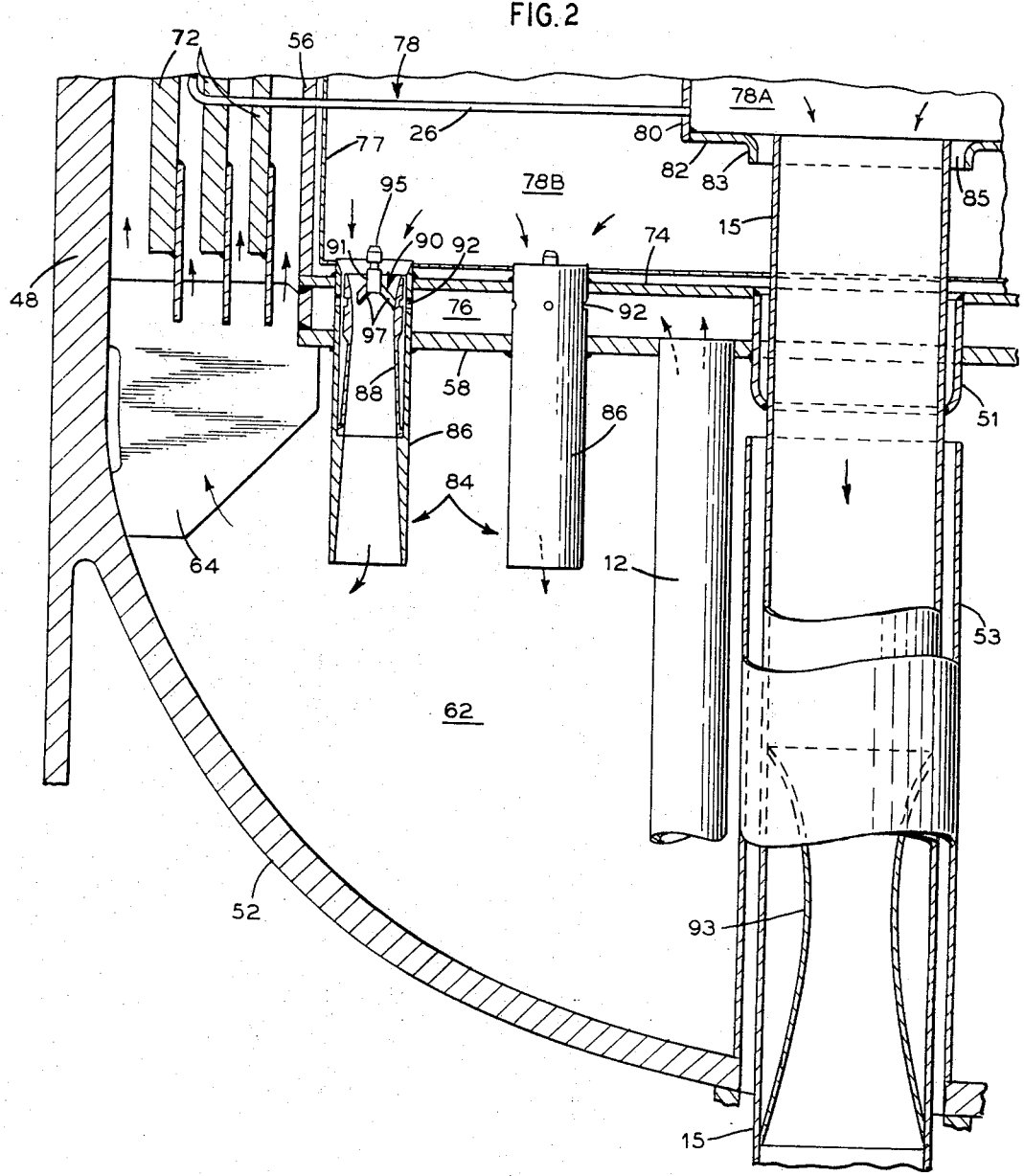

Of the drawings:
FIG. 1 is a schematic illustration of the reactor system of the present invention;
FIG. 2 is an enlarged view of a portion of the FIG. 1 system; and
FIG. 3 is a plan section taken along the line 3—3 of FIG. 1.

In the power plant illustrated feed water is supplied through a conduit 12 to a vapor cooled fast breeder reactor 14 at a rate in excess of vapor demand. Reactor 14 is constructed and arranged to deliver superheated vapor through parallel flow conduits 15 to a high pressure turbine 16 for expansion therein, with the vapor then exhausting through a conduit 18 to a condenser 20, where it is condensed at a low pressure for return to the feed water system. From the condenser the condensate passes by way of a conduit 22 to a pump 24 from which it discharges through conduit 12 and a feed water heater 25 associated therewith for return to the reactor. A controlled quantity of saturated water flows from the reactor to a drum or accumulator 32 by way of a conduit 34. Drum 32 is connected to the inlet side of a pump 38 arranged to discharge water at a predetermined rate into conduit 12 for return into the reactor along with feed water from pump 24.

In accordance with the invention, reactor 14 comprises an upright cylindrical containment vessel 40 closed at its upper and lower ends by integrally formed hemispherical heads 42 and 46. Vessel 40 is occupied by an upright cylindrical reactor vessel 48 closed at its upper and lower ends by hemispherical heads 50 and 52, respectively, and having a cylindrical extension 54 formed at its lower end with an outwardly extending flange 55 carried by a support ring 44 connected to the containment vessel 40.

An upright cylindrical shell 56 is positioned in vessel 48; is open at its upper end; has its lower end closed by a horizontal circular plate 58; and cooperates with vessel 48 to form an annular vapor flow passage 60. Plate 58 cooperates with vessel 48 to form a vapor and water separating chamber 62. The upper end of shell 56 is located contiguous to head 50 with a suitable seal against vapor flow being provided between the head and shell to inhibit vapor flow at this point while permitting relative movement between such parts. Support for the shell is provided by an annular ring 64 connected to vessel 48. The lower portion of shell 56 is occupied by a nuclear reactor core 66 containing fuel elements 68 and blanket elements 70, such elements being constructed and arranged in the manner disclosed in copending U.S. application Serial No. 359,267, filed April 13, 1964, now U.S. Patent No. 3,317,399. The core is supported at its bottom in a suitable manner by a grid structure secured to the shell. Normal control of the reactor is effected by means of control rods, not shown, located in the core. Head 50 cooperates with the upper portion of shell 56 to form a core coolant inflow compartment 71.

Vapor flow passage 60 is divided into a plurality of parallel flow channels by upright, concentric, cylindrical thermal shields 72 disposed around core 66 and supported at their lower ends by ring 64. These shields are so placed as to minimize the radiation damage and the thermal heating of vessel 48 by the neutron flux and gamma radiation which emanate from the reactor core. Core control rod drives and command lines therefor may be constructed and arranged in the manner disclosed in copending U.S. application Serial No. 480,956, filed August 19, 1965, now abandoned.

With reference to FIG. 2, the lower end of shell 56 is provided with a horizontally arranged circular plate 74 weld-united along its periphery to the circumferential wall of shell 56 and cooperating with plate 58 to form a feed water inlet chamber 76. Plate 74 also combines with the circumferential wall of shell 56 and the bottom of the support structure of core 66 to provide a core coolant outflow compartment 78. A cylindrical partition 80, closed at its lower end by a plate 82 and secured at its upper end to the support structure of core 66, divides compartment 78 into chambers 78A and 78B. The shell portion of compartment 78B and the top side of plate 74 are protected by thermal shielding 77. Plate 82 is formed with ports 83 arranged to receive the inlet ends of turbine supply conduits 15, each port and its corresponding conduit being arranged to provide an annular flow space 85 therebetween. Chamber 78A is also connected by conduits 26 for parallel supply of vapor to turbines 28 arranged to drive reactor core collant circulators 30. Each conduit 26 has its inlet end connected to partition 80, and extends through shell 56 in sealing relation therewith, then through thermal shields 72 to the channel formed between the two outermost shields, and then upwardly in such channel for connection to its corresponding turbine 28. Feed water is supplied to chamber 76 by conduit 12 which extends through head 52 in sealing relation therewith. Chamber 76 is provided with desuperheaters 84 comprising vertically arranged short tubular conduits 86 extending through and weld-united to plates 58 and 74 and opening at their upper ends to chamber 78B and at their lower ends to chamber 62. Each tubular conduit 82 is fitted with a Venturi tube 88 having a spray device 90 in its inlet, with the Venturi tube and its associated conduit being formed at the same level with a horizontal row of circular holes 92. Each spray device 90 includes a barrel portion 91 arranged to spray feed water axially into its corresponding Venturi tube for mixing with the superheated vapor passing therethrough and connected for supply of feed water from chamber 76 by tubes 97 secured to tube 88 and registering with the holes 92 thereof, with barrel 91 having its upper end formed with a projection 95 permitting when necessary removal, by means of a suitable tool, of the spray device and its associated Venturi tube through access means provided in the core support structure.

Vapor outflow from the outer portion of core 66 passes to chamber 78B and thence to desuperheaters 84; while vapor outflow from the central portion of the core is directed into chamber 78A and thence in most part through conduits 15, the remainder passing through conduits 26 to turbines 28 and through annular passages 83 to chamber 78B for mixing with the lower temperature vapor outflow from the outer portion of the core. Since the outer portion of the core has a steeper radial power profile than its central portion, the temperature of the vapor outflow from the core outer portion must be less than that of the core central portion to prevent excessive clad surface temperatures. Passages 83 are so sized as to permit sufficient vapor flow therethrough after a turbine trip out to prevent damage to the core control zone. Each conduit 15 opens into chamber 78A, extends through heads 52 and 46 in sealing relation therewith, and is fitted with a Venturi type sonic flow restrictor 93 at its junction with head 52. Cylindrical thermal shields 51 and 53 enclose and are spaced from each conduit 15, the former being provided at the position where the conduit extends through chamber 76 and the latter extending along the conduit from the inner surface of head 52 to a position subjacent sleeve 51.

Passage 60 has its upper portion provided with an upright frusto-conical steam scrubber 94 of known construction secured at its large end to vessel 48 at a position superjacent shields 72 and at its small end to shell 56. Shell 56 has the upper portion of its circumferential wall fitted with circulating pumps 30. Each pump 30 extends in closely fitting relation through scrubber 94, discharges directly to compartment 71, and has its intake situated in passage 60 outside scrubber 94 and its associated turbine 28 extending through vessel 48 in sealing relation therewith and through vessel 40. An electric motor 57 is coupled to the drive shaft of each turbine 28 for startup, shutdown and emergency cooling. Thus coolant flow in the core is ensured in the event of loss of electric power or vapor flow. Each motor 57 and the outer end of its associated turbine is enclosed by a bulb-shaped containment member 59 connected in sealing relation to vessel 40.

From the above it is evident that all of the elements of the Loeffler cycle, i.e., the circulating pumps, the desuperheaters, the vapor scrubber and the vapor recirculation flow path, are enclosed in the reactor vessel. Elimination of the relatively large recirculating vapor lines typical of a conventional Loeffler cycle, coupled with the use of flow restrictors 93 in turbine supply lines 15, help to control the rate of accidental coolant loss, to prevent core, desuperheater, scrubber and circulator damage, and to provide dependable control rod action during such loss. Also, elimination of such external recirculating vapor lines provides a material reduction in pumping power requirements.

In operation feed water is supplied to desuperheaters 84 by way of chamber 76 at a rate in excess of the total vapor demand by turbines 16 and 28, part of the supply coming from the condenser 22 by way of pump 24, and the remainder from drum 32 via pump 38. The pump 24 supply is controlled to match the vapor requirements of turbines 16 and 28; while the pump 38 supplies the excess flow which is about 10% greater than the total vapor demand at full load and around 20% at half load. The excess flow of desuperheater spray water constitutes an important safety and control feature of the system. This permits stable, load-following operation when the reactor has a positive voiding characteristic; and improves coolant loss safety since a significant automatic increase in the vapor generation rate takes place to offset any decrease in the reactor vessel pressure. Excess desuperheater spray also assures that desuperheater outflow will be at saturation temperature, thereby minimizing pumping power requirements and simplifying the control of feed water flow. From chamber 76 the feed water is directed through holes 92 and spray devices 90 into intimate mixing relation with the superheated vapor inflow to Venturis 88 to desuperheat the vapor while converting feed water into saturated vapor. The resulting vapor-liquid mixture discharges to chamber 62 at saturation temperature wherein the liquid is separated from the vapor, mainly due to reduction in flow velocity and an abrupt change in direction of flow.

Separated saturated vapor passes upwardly from chamber 62 through passage 60 and over shields 72 and then through scrubber 94 to the intake side of the turbine-driven circulators 30. Scrubber 94 is provided to separate any moisture particles still in the vapor, the separated moisture flowing downwardly through passage 60 to chamber 62 by means of suitable drain conduits, not shown. From the circulators 30 the vapor flows through chamber 71 to and through reactor core 66 wherein it is superheated by removing heat generated by the fission reaction. Superheated vapor outflow from the central portion of the core is directed into chamber 78A from which part passes through conduits 26 to turbines 28, a small portion flows through passages 83 to chamber 78B, and the remainder enters turbine supply conduits 15. From conduits 15 vapor passes through turbine 16 and then, after being condensed, flows to the intake side of pump 24.

The excess liquid separated in chamber 62 overflows to and through conduit 34 to drum 32 wherein a water level is maintained. Liquid from drum 32 is returned by circulating pump 38 to conduit 12 for mixing with the feed water from pump 24. Drum 32 acts as a flywheel in the event of a loss-of-coolant accident, thus decreasing the severity of such an accident.

The division of vapor flow between the power turbine and the circulator drive turbines is determined by controls associated with the respective turbines. Vapor flow to turbine 16 is varied in response to change in load demand; while vapor flow to turbines 28 is governed by reactor outlet vapor temperature plus anticipatory signals from load demand and reactor vessel vapor pressure. Under conditions where reactivity increases with a decrease in vapor density, feed water is controlled by water level in drum 32 with anticipatory signals from load demand and reactor vessel vapor pressure. When load demand is increased under the above conditions, the pressure in the turbine vapor supply circuitry drops momentarily which causes a reduction in the density of the vapor flowing through the reactor core. The reduction in vapor density automatically causes the rate of reaction to increase. Consequently, the temperature of the core vapor outflow increases which causes an increase in the rate of conversion of feed water to saturated vapor in desuperheaters 84. Feed water supply to chamber 76 is set to exceed vapor demand of turbines 16 and 28 over the load range so that excess desuperheater spray is available at all times to permit the reactor to automatically generate more vapor when load demand is increased. Increasing the rate of generation of saturated vapor results in an increase in vapor flow through the circulators and core to the turbine supply conduits to the extent that the core vapor outlet temperature is reduced to its desired value, the pressure in the turbine supply conduit is restored to its original value and the combined increased in vapor demand by the power turbine and circulator drive turbines is met.

A particular example of a reactor system incorporating the present invention could operate under the following conditions:

| | | |
|---|---|---|
| Thermal power | mw | 2500 |
| Net power | mw | 940 |
| Core pumping power | mw | 75 |
| Reactor core inlet vapor conditions | p.s.i | [1]1200 |
| Maximum cladding surface temperature, °F. | | 1300 |
| Reactor core vapor flow | lbs./hr | $32.7 \times 10^6$ |
| Vapor temperature at power turbine, °F. | | 950 |
| Steam pressure at power turbine | p.s.i | 1050 |

[1] Saturated.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. An integral vapor generator-nuclear reactor comprising
an upright reactor vessel,
an upright shell disposed in and cooperating with the reactor vessel to form a vapor flow passage,
a nuclear core in the shell,
a vapor desuperheater in the reactor vessel,
means supplying feed water to the desuperheater,
means circulating vapor through the vapor flow passage to and through the core for superheating the vapor,
means for directing part of the core superheated vapor outflow through the desuperheater in mixing relation with feed water to generate saturated vapor,
means in the reactor vessel for separating saturated vapor from the desuperheater vapor-liquid outflow and directing such saturated vapor to the vapor flow passage, and
means for directing another part of the core superheated vapor outflow from the reactor vessel to a point of use.

2. An integral vapor generator-nuclear reactor according to claim 1, wherein a feed water supply chamber is located at the lower end of the shell and communicates with the desuperheater.

3. An integral vapor generator-nuclear reactor according to claim 1, wherein the separating means includes a vapor-liquid separating chamber in the lower portion of the reactor vessel arranged to receive desuperheater vapor-liquid outflow and to direct separated vapor to the vapor flow passage.

4. An integral vapor generator-nuclear reactor according to claim 1, wherein the reactor vessel and shell are cylindrical in form, the vapor flow passage is annular in shape, and the shell has a vapor outflow compartment between the core and the desuperheater.

5. An integral vapor generator-nuclear reactor according to claim 4, wherein partition means are provided in the vapor outflow compartment for directing part of the core superheated vapor outflow to the desuperheater and another part from the reactor vessel to the point of use.

6. An integral vapor generator-nuclear reactor according to claim 4, wherein the desuperheater comprises a conduit opening to said vapor outflow compartment, and a flow resistor in the conduit, the conduit and flow resistor being formed with openings communicating with the feed water supply chamber and permitting inflow of feed water to the flow resistor for mixing with vapor flowing therethrough.

7. An integral vapor generator-nuclear reactor according to claim 4, wherein an upright containment vessel completely encloses the reactor vessel, a feed water supply chamber is located in the lower portion of the shell, the feed water supply means supplies feed water to the feed water supply chamber at a rate in excess of the reactor vessel vapor outflow, the separating means includes a vapor-liquid separating chamber in the lower portion of the reactor vessel, the desuperheater comprises a tubular conduit opening at its opposite ends to the vapor outflow compartment and to the separating chamber and a venturi tube is fitted into the tubular conduit, the tubular conduit and venturi tube being formed with openings communicating with the feed water supply chamber and permitting inflow of feed water to the venturi tube for mixing with vapor flowing therethrough, the vapor flow passage is provided with a thermal shield surrounding the core, a vapor scrubber is disposed in the upper portion of the vapor flow passage superjacent the shield, the vapor circulating means includes a pump supplied with scrubber vapor outflow and discharging vapor directly into the upper portion of the shell for flow to the core, and means are provided for circulating separated liquid from the separating chamber of the reactor vessel back to the feed water supply chamber.

8. An integral vapor generator-nuclear reactor according to claim 1, wherein the feed water supply means supplies feed water to the desuperheater at a rate in excess of the reactor vessel vapor outflow.

9. An integral vapor generator-nuclear reactor according to claim 8, wherein the separating means includes a vapor and water separating chamber in the lower portion of the reactor vessel arranged to receive desuperheater vapor-liquid outflow, means for directing separated saturated vapor from the separating chamber to the vapor flow passage, and means for circulating separated liquid from the reactor vessel back to the desuperheater.

10. An integral vapor generator-nuclear reactor according to claim 1, wherein the vapor flow passage is provided with a thermal shield surrounding the core, and the vapor circulating means includes a pump supplied with vapor from said passage and discharging vapor directly into the upper portion of the shell for flow to the core.

11. An integral vapor generator-nuclear reactor according to claim 10, wherein a vapor scrubber is disposed in the vapor flow passage intermediate the shield and the inlet side of the pump.

12. An integral vapor generator-nuclear reactor according to claim 1, wherein the vapor circulating means includes a pump, a vapor turbine drives the pump, and means are provided for directing a part of the reactor vessel vapor outflow to the vapor turbine.

13. An integral vapor generator-nuclear reactor according to claim 12, wherein the pump discharges vapor directly into the upper portion of the shell for flow to the core, and the reactor vessel outflow means includes a conduit and a flow resistor in the conduit.

References Cited

UNITED STATES PATENTS

| | | | |
|---|---|---|---|
| 3,085,964 | 4/1963 | Ritz et al. | 176—60 |
| 3,103,917 | 9/1963 | Bauer et al. | 176—60 |
| 3,108,938 | 10/1963 | Nettel et al. | 176—59 |
| 3,274,065 | 9/1966 | Kierulf et al. | 176—61 |
| 3,275,521 | 9/1966 | Schluderberg et al. | 176—18 |

CARL D. QUARFORTH, *Primary Examiner.*